(12) United States Patent
Bian et al.

(10) Patent No.: US 12,298,208 B2
(45) Date of Patent: May 13, 2025

(54) DEVICE FOR PREPARING ROCK SPECIMENTS WITH DIFFERENT MOISTURE CONTENTS

(71) Applicant: Institute of Geology and Geophysics, Chinese Academy of Sciences, Beijing (CN)

(72) Inventors: Hang Bian, Beijing (CN); Zhaobin Zhang, Beijing (CN); Shouding Li, Beijing (CN); Xiao Li, Beijing (CN); Jianming He, Beijing (CN); Bo Zheng, Beijing (CN); Tianqiao Mao, Beijing (CN); Guanfang Li, Beijing (CN); Peng Guo, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/840,461

(22) PCT Filed: May 22, 2024

(86) PCT No.: PCT/CN2024/094720
§ 371 (c)(1),
(2) Date: Aug. 21, 2024

(87) PCT Pub. No.: WO2024/245072
PCT Pub. Date: Dec. 5, 2024

(65) Prior Publication Data
US 2025/0116579 A1    Apr. 10, 2025

(30) Foreign Application Priority Data
Jun. 2, 2023 (CN) .......................... 202310648080.0

(51) Int. Cl.
*G01N 1/28* (2006.01)

(52) U.S. Cl.
CPC ...................................... *G01N 1/28* (2013.01)

(58) Field of Classification Search
CPC .......... G01N 1/28; G01N 5/025; G01N 5/045; G01N 19/10
See application file for complete search history.

(56) References Cited

FOREIGN PATENT DOCUMENTS

| CN | 205301034 U | 6/2016 |
|----|-------------|--------|
| CN | 106680129 A | 5/2017 |

(Continued)

OTHER PUBLICATIONS

English machine translation of CN 108918324 A (Year: 2018).*

(Continued)

*Primary Examiner* — David Z Huang
(74) *Attorney, Agent, or Firm* — Hawaii Patent Services; Nathaniel K. Fedde; Kenton N. Fedde

(57) ABSTRACT

The present application disclose a device for preparing rock samples with different moisture contents, which comprises a sample container, wherein two ends of the rock sample are respectively connected with a first steam inlet and a first steam outlet of the sample container; the first steam outlet, a pump and a gas-liquid separator are connected in sequence, a gas outlet end of the gas-liquid separator, a steam compressor and the first steam inlet are connected in sequence, and a liquid outlet end of the gas-liquid separator, a steam generator and the steam compressor are connected in sequence. The water vapor in the sample container is pumped into the gas-liquid separator by the pump to separate low-temperature water vapor and condensate, and the low-temperature water vapor and condensate form high-temperature and high-pressure steam again and return to the inside of the sample container. The water in the steam generator always circulates inside the preparation device. The measuring instrument measures the reduction of the (Continued)

water in the steam generator, and subtracts the pre-recorded reduction of the water in the steam generator when the preparation device is idling, so as to obtain the water amount of the rock sample, and then calculate the moisture content of the rock sample.

10 Claims, 2 Drawing Sheets

(56) References Cited

FOREIGN PATENT DOCUMENTS

| | | | | |
|---|---|---|---|---|
| CN | 207366310 U | | 5/2018 | |
| CN | 108918324 A | * | 11/2018 | ............. C10G 1/002 |
| CN | 109163971 A | | 1/2019 | |
| CN | 110398435 A | | 11/2019 | |
| CN | 210154894 U | | 3/2020 | |
| CN | 114674707 A | | 6/2022 | |
| KR | 101260177 B1 | * | 5/2013 | |
| WO | 2021150147 A1 | | 7/2021 | |

OTHER PUBLICATIONS

English Machine Translation of CN 110398435 A (Year: 2019).*
English Machine Translation of CN 210154894 U (Year: 2020).*
English Machine Translation of KR 101260177 B1 (Year: 2013).*
Zhou, Hui et al, "Chemo-thermodynamical method for precisely preparing rock sample with different water contents". Rock and Soil Mechanics, vol. 34, issue 02. pp. 311-315.

\* cited by examiner

DEVICE FOR PREPARING ROCK SPECIMENTS WITH DIFFERENT MOISTURE CONTENTS

TECHNICAL FIELD

The present application relate to that field of preparing rock sample, in particular to a device for preparing rock samples with different moisture contents.

BACKGROUND

When preparing rock samples with different moisture contents, drying method, vacuum pumping method and constant wet method are usually adopted. At present, there is also a moisture content control method for rock samples with the above methods. For example, the Chinese patent No. CN210154894U discloses a high-temperature water mist saturation device for rock samples.

The technical means adopted by this method for saturating rock samples are: pressing high-temperature and high-pressure water vapor into the interior of the rock samples, and the water vapor remains in the microscopic cracks in the rock samples after condensation, so as to improve the moisture content of the rock samples.

The rock samples prepared by this method can be quickly saturated with water, but it is difficult to control the moisture content of rock samples. To obtain rock samples with different moisture contents, we can only measure the weight of rock samples after introducing steam for a specified time by empirical method, and then calculate their moisture content, and then relate the time of introducing steam to the moisture content.

The data obtained by this empirical method is inaccurate, and there will be a big error when the internal structure of the rock sample changes slightly. If the moisture content of the rock sample can be obtained in the preparation process, the above problems can be solved.

SUMMARY

The object of the present application is to provide a device for preparing rock samples with different moisture contents, so as to solve the technical problem that it is difficult to control the moisture content of rock samples when using high-temperature and high-pressure steam to saturate the rock samples.

In order to solve the above technical problems, the present application specifically provides the following technical solution:

A device for preparing rock samples with different moisture contents includes a sample container, a steam generator, a steam compressor, a pump, a gas-liquid separator and a measuring instrument; the sample container includes a first steam inlet and a first steam outlet, a rock sample is placed inside the sample container, and two ends of the rock sample are respectively connected with the first steam inlet and the first steam outlet; the first steam outlet, the pump and the gas-liquid separator are connected in sequence; a gas outlet end of the gas-liquid separator, the steam compressor and the first steam inlet are connected in sequence; and a liquid outlet end of the gas-liquid separator, the steam generator, the steam compressor and the first steam inlet are connected in sequence; the water vapor in the sample container is pumped into the gas-liquid separator by the pump to separate low-temperature water vapor and condensate, the low-temperature water vapor is compressed by the steam compressor and then forms high-temperature and high-pressure water vapor again to return to the interior of the sample container, and the condensate enters the steam generator to form water vapor again and returns to the interior of the the sample container after being compressed by the steam compressor; and a measuring end of the measuring instrument is installed inside the steam generator, and the measuring instrument is used for measuring a reduction of stored water inside the steam generator and further calculating a moisture content of the rock sample.

Further, a temperature control device is installed inside the sample container, and the temperature control device is used for controlling a temperature inside the sample container so that the temperature inside the sample container is higher than a condensation temperature of the water vapor before the water vapor permeates two ends of the rock sample to start circulating, and the temperature inside the sample container is gradually decreased after the water vapor permeates the two ends of the rock sample to start circulating so that the water vapor in the rock sample is uniformly condensed.

Further, the temperature control device includes a cold air blower, and the sample container includes an air cooling inlet and an air cooling outlet; the air cooling inlet and the air cooling outlet are both provided with on-off valves; the air cooling inlet is connected with an output end of the cold air blower, the air cooler is used for outputting cold air to the air cooling inlet after the on-off valve is opened, and the cold air is discharged through the air cooling outlet.

Further, the sample container includes a cylindrical first chamber, which is coaxial with the rock sample; the first steam inlet and the first steam outlet are both connected with the first chamber; the air cooling inlet and the air cooling outlet are located at two ends of the first chamber respectively, and the extension directions of the air cooling inlet and the air cooling outlet are both perpendicular to an axis of the first chamber and tangent to an inner wall of the first chamber.

In another aspect, the sample container includes a first chamber, and the rock sample is placed in the first chamber; the first steam inlet and the first steam outlet are both connected with the first chamber, and the sample container is provided with a second steam inlet and a second steam outlet which are connected with the interior of the first chamber; an output end of the steam compressor is connected with the second steam inlet, and the second steam outlet is connected with an input end of the gas-liquid separator.

Further, the output end of the steam compressor is connected with the second steam inlet through a first three-way valve, and a remaining port of the first three-way valve is connected with the atmosphere; the second steam outlet is connected with the input end of the gas-liquid separator through a second three-way valve, and a remaining port of the second three-way valve is connected with an input end of the pump.

In another aspect, the sample container includes a first chamber, a second chamber and a third chamber, wherein the rock sample is placed inside the first chamber, the second chamber is connected with the first steam inlet, and the third chamber is connected with the first steam outlet; the second chamber is connected with the first chamber through a plurality of air inlets, and one end of the rock sample is connected with the air inlets; the third chamber is connected with the first chamber through a plurality of air outlets, each air inlet coaxially corresponds to one air outlet, and the other end of the rock sample is connected with the air outlets.

Further, a shell of the sample container is prepared by a heat preservation material.

Further, a water jacket is sleeved on a peripheral wall of the rock sample, and the water jacket is used for preventing water vapor from penetrating through the peripheral wall of the rock sample and entering the interior of the sample container.

Further, a sealing ring is installed between an end face of the rock sample and an inner wall of the sample container, and the sealing ring is used to close a gap between the end face of the rock sample and the inner wall of the sample container so as to prevent water vapor from entering the interior of the sample container through the end face of the rock sample.

Compared with the prior art, the application has the following beneficial effects:
the present application provide a device for preparing rock sample with different moisture contents, wherein that water vapor in the sample contain is pumped into a gas-liquid separator to separate low-temperature water vapor and condensate, and the low-temperature water vapor and condensate form high-temperature and high-pressure steam again and return to the inside of the sample container; the water stored in the steam generator is always circulated in the preparation device; a measuring instrument measures the reduction amount of the water stored in the steam generator, and subtracts the pre-recorded reduction amount of the water stored in the steam generator when the preparation device is idling, so that the water amount of the rock sample can be obtained, and then the moisture content of the rock sample can be calculated.

BRIEF DESCRIPTION OF DRAWINGS

In order to explain the embodiment of the present application or the technical solution in the prior art more clearly, the drawings needed in the description of the embodiment or the prior art will be briefly introduced below. Obviously, the attached drawings in the following description are only exemplary. For the those skilled in the art, other implementation drawings can be obtained by extension according to the attached drawings without creative work.

The reference signs in the figures are as follows:
1—Sample container; 11—First chamber; 111—First steam inlet; 112—First steam outlet; 113—Air cooling inlet; 114—Air cooling outlet; 115—Second steam inlet; 116—Second steam outlet; 12—Second chamber; 121—Air inlet; 13—Third chamber; 131—Air outlet; 14—On-off valve; 15—First three-way valve; 16—Second three-way valve; 2—Rock sample; 21—Water jacket; 22—Sealing ring; 3—Steam generator; 4—Steam compressor; 5—Pump; 6—Gas-liquid separator; 7—Measuring instrument; 8—Temperature control device; 81—Resistance wire; 82—Cold air blower.

DESCRIPTION OF EMBODIMENTS

The technical solution in the embodiment of the present application will be clearly and completely described below with reference to the attached drawings. Obviously, the described embodiment is only a part of the embodiment of the present application, but not the whole embodiment. Based on the embodiments in the present application, all other embodiments obtained by those skilled in the art without creative labor fall into the scope of protection of the present application.

Embodiment 1 of a device for preparing rock samples with different moisture contents is provided to solve the technical problem that it is difficult to control the moisture content of the rock sample 2 when it is saturated with high-temperature and high-pressure steam.

Figure 1:
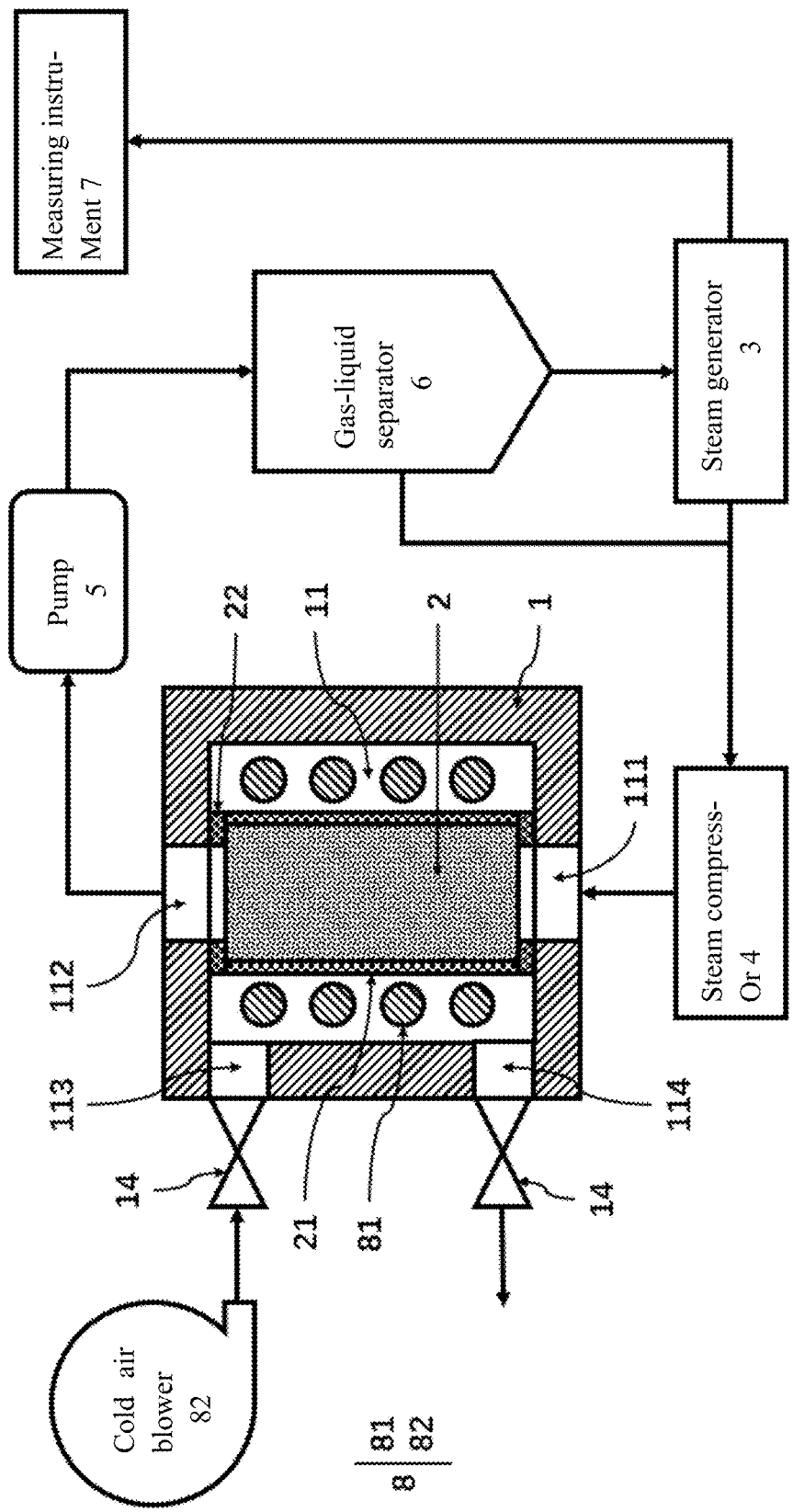
FIG. 1 is a structural principle block diagram of Embodiment 1 of the present application.

Please refer to FIG. 1:

The preparation device includes a sample container 1, a steam generator 3, a steam compressor 4, a pump 5, a gas-liquid separator 6 and a measuring instrument 7.

The sample container 1 includes a first steam inlet 111 and a first steam outlet 112. The rock sample 2 is placed inside the sample container 1, and both ends of the rock sample 2 are connected with the first steam inlet 111 and the first steam outlet 112 respectively.

The first steam outlet 112, the pump 5 and the gas-liquid separator 6 are sequentially connected, the gas outlet end of the gas-liquid separator 6, the steam compressor 4 and the first steam inlet 111 are sequentially connected, and the liquid outlet end of the gas-liquid separator 6, the steam generator 3, the steam compressor 4 and the first steam inlet 111 are sequentially connected.

The water vapor in the sample container 1 is pumped by the pump 5 into the gas-liquid separator 6 to separate low-temperature water vapor and condensate, and the low-temperature water vapor is compressed by the steam compressor 4 to form high-temperature and high-pressure water vapor and then returns to the sample container 1. The condensate enters the steam generator 3 to form water vapor again and returns to the sample container 1 after being compressed by the steam compressor 4.

The measuring end of the measuring instrument 7 is installed in the steam generator 3, and the measuring instrument 7 is used to measure the reduction of the stored water in the steam generator 3 and then calculate the moisture content of the rock sample 2.

The pump 5 is a pump suitable for liquids and gases.

The preparation device changes the moisture content of the rock sample 2 through the following steps:

Step 1: the amount a of water stored in the steam generator 3 is recorded, and the reduction amount b of water stored in the steam generator 3 when the preparation device is idling (that is, water vapor circulates inside without being input into the rock sample 2).

Step 2: the rock sample 2 is dried and then put into the sample container 1, and the water amount stored in the steam generator 3 is replenished to a.

Step 3, the steam generator 3 heats the water to form steam, the steam is introduced into the steam compressor 4 to be compressed into high-temperature and high-pressure steam, and the high-temperature and high-pressure steam enters the interior of the rock sample 2 to be condensed into water and fills the micro cracks of the rock sample 2.

Step 4, the air and uncondensed water vapor in the rock sample 2 are pumped into the gas-liquid separator 6 by the pump 5, wherein the low-temperature water vapor is compressed into high-temperature and high-pressure water vapor by the steam compressor 4 and enters the rock sample 2 again, and the condensed water flows back into the steam generator 3.

Step 5, the measuring instrument 7 obtains the reduction amount c of water in the steam generator 3 through the water level sensor or weighing. Since the water vapor is not in contact with the outside in steps 3 and 4, therefore:

the water amount of the rock sample 2=a-b-c;

the moisture content of the rock sample 2 can be calculated by the water amount of the rock sample 2.

Further, in Embodiment 1, water vapor may penetrate the rock sample 2 and enter the sample container 1, which will affect the measurement result of the measuring instrument 7. In order to solve this technical problem:

a water jacket 21 is sleeved on the outer peripheral wall of the rock sample 2 to prevent water vapor from penetrating through the outer peripheral wall of the rock sample 2 and entering the sample container 1.

The water jacket 21 is made of a heat shrinkable tube. The heat shrinkable tube is sleeved outside the rock sample 2 and then heated to tightly wrap the rock sample 2, and then the parts of the heat shrinkable tubes beyond the two ends of the rock sample 2 are cut off.

Further:

A sealing ring 22 is installed between the end face of the rock sample 2 and the inner wall of the sample container 1. The sealing ring 22 is used to close the gap between the end face of the rock sample 2 and the inner wall of the sample container 1, so as to prevent water vapor from entering the sample container 1 through the end face of the rock sample 2.

The sealing ring 22 can be fixed on the end face of the rock sample 2 or the inner wall of the sample container 1. The outer diameter of the sealing ring 22 is larger than that of the rock sample 2, and the inner diameter of the sealing ring 22 is smaller than that of the rock sample 2.

Further, in Embodiment 1, because water vapor enters through one end of the rock sample 2 and then leaves from the other end, when the rock sample 2 is not saturated with water, the moisture content at both ends of the rock sample 2 will be different, which will affect the subsequent tests. In order to solve the above technical problems:

A temperature control device 8 is installed inside the sample container 1, which is used to control the temperature inside the sample container 1, so that the temperature inside the sample container 1 is higher than the condensation temperature of the water vapor before the water vapor starts circulating through the two ends of the rock sample 2, and after the water vapor starts circulating through the two ends of the rock sample 2, the temperature inside the sample container 1 is gradually reduced, so that the water vapor inside the rock sample 2 is uniformly condensed.

The temperature control device 8 includes a resistance wire 81, which is wound around the outside of the rock sample 2 and can raise the temperature inside the sample container 1.

The temperature control device 8 further includes humidity sensors arranged at the first steam inlet 111 and the first steam outlet 112, and the humidity sensors are not shown in the figure.

When the humidity of the first steam inlet 111 and the first steam outlet 112 are the same, it means that the water vapor begins to circulate through both ends of the rock sample 2. At this time, the resistance wire 81 is turned off, and the temperature inside the sample container 1 gradually drops. As the water vapor gradually condenses inside the rock sample 2, the water inside the steam generator 3 gradually decreases. When the reduction amount of water inside the steam generator 3 reaches the expected moisture content of the rock sample 2, the steam generator 3, the steam compressor 4 and the pump 5 are turned off.

Further, in order to reduce the power consumption of the resistance wire 81:

the shell of the sample container 1 is made of heat preservation material.

The sample container 1 is made of heat-insulating foam to reduce the heat exchange between the resistance wire 81 and the outside.

The end or side of the sample container 1 can be moved, so that workers can put in or take out the rock sample 2.

Further, in order to accelerate the cooling speed inside the sample container 1 and improve the preparation efficiency of the rock sample 2:

The temperature control device 8 includes a cold air blower 82, and the sample container 1 includes an air cooling inlet 113 and an air cooling outlet 114. The air cooling inlet 113 is connected with the output end of the cold air blower 82, the cold air blower 82 is used to output cold air to the air cooling inlet 113 after the on-off valve 14 is opened, and the cold air is discharged through the air cooling outlet 114.

When the resistance wire 81 is energized, the on-off valve 14 is closed; when the resistance wire 81 is de-energized, the on-off valve 14 is opened.

Further, in order to improve the efficiency of cold air cooling the rock sample 2 in the sample container 1 and reduce the energy consumed by the cold air blower 82:

The sample container 1 includes a cylindrical first chamber 11, which is coaxial with the rock sample 2. The air cooling inlet 113 and the air cooling outlet 114 are located at both ends of the first chamber 11, and their extension directions are perpendicular to the axis of the first chamber 11 and tangent to the inner wall of the first chamber 11.

A cylindrical chamber is formed between the inner wall of the first chamber 11 and the outer wall of the rock sample 2, so that the cold air moves spirally from the air cooling inlet 113 to the air cooling outlet 114, and the cooling efficiency of the cold air is improved by extending the moving distance of the cold air.

Figure 2:
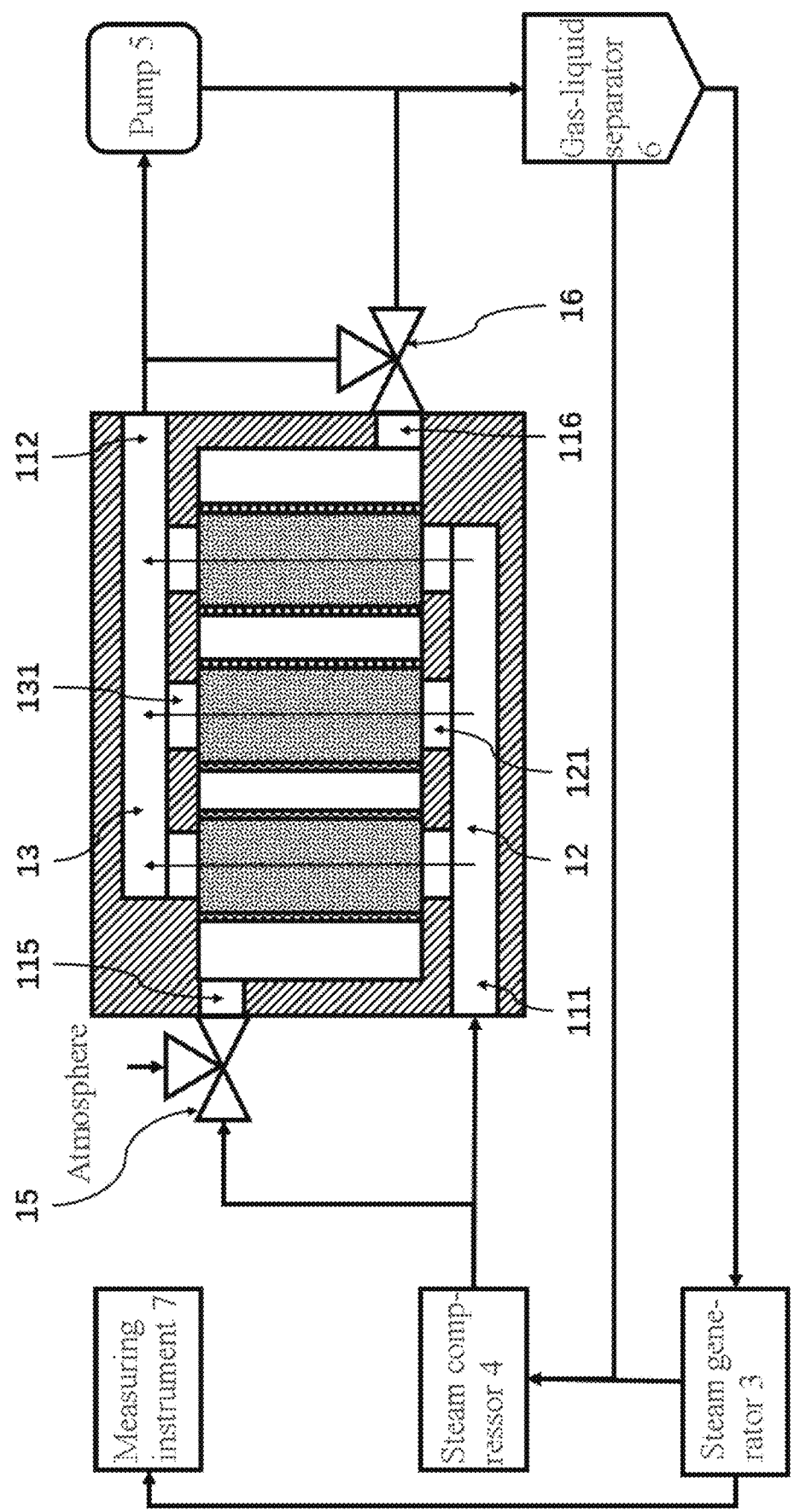
FIG. 2 is a structural principle block diagram of Embodiment 2 of the present application.

In another as, in order to reduce the number of instruments used in the preparation device and the cost of the preparation device, but retain the function of controlling the internal temperature of the sample container 1, please refer to Embodiment 2 shown in FIG. 2:

The sample container 1 includes a first chamber 11, a rock sample 2 is placed in the first chamber 11, and the sample container 1 is provided with a second steam inlet 115 and a second steam outlet 116 which are connected with the interior of the first chamber 11.

The output end of the steam compressor 4 is connected to the second steam inlet 115, and the second steam outlet 116 is connected to the input end of the gas-liquid separator 6.

In Embodiment 2, high-temperature and high-pressure steam is used to heat the outer peripheral wall of the rock sample 2 instead of the resistance wire 81, so that the temperature inside the rock sample 2 is higher than the condensation temperature of the steam, and the low-temperature steam and condensed water inside the first chamber 11 move into the gas-liquid separator 6 through the second steam outlet 116.

Further, in order to quickly reduce the temperature inside the sample container 1 and improve the preparation speed of the rock sample 2:

The output end of the steam compressor 4 is connected with a second steam inlet 115 through a first three-way valve 15, and the remaining port of the first three-way valve 15 is connected with the atmosphere.

The second steam outlet 116 is connected to the input end of the gas-liquid separator 6 through a second three-way valve 16, and the remaining port of the second three-way valve 16 is connected to the input end of the pump 5.

Before the steam generator 3 is started, the first three-way valve 15 is connected with the steam compressor 4 with the first chamber 11, and the second three-way valve 16 is connected with the first chamber 11 with the gas-liquid separator 6.

After the steam generator 3 runs for a period of time, and the water vapor permeates the two ends of the rock sample 2 and begins to circulate, the first three-way valve 15 connects the atmosphere with the first chamber 11, and the second three-way valve 16 connects the first chamber 11 with the pump 5. The pump 5 pumps out the air in the first chamber 11 and transmits it to the gas-liquid separator 6. The cold air from outside enters the first chamber 11 through the first three-way valve 15 to cool the rock sample 2.

Through the above steps, the temperature inside the sample container 1 can be controlled without using the resistance wire 81 and the cold air blower 82.

Further, in Embodiment 1 and Embodiment 2, in order to improve the preparation efficiency of rock samples 2, a plurality of rock samples 2 can be prepared at one time, please refer to FIG. 2:

The sample container 1 includes a second chamber 12 and a third chamber 13, wherein the second chamber 12 is connected with the first steam inlet 111 and the third chamber 13 is connected with the first steam outlet 112.

The second chamber 12 is connected with the first chamber 11 through a plurality of air inlets 121, and one end of the rock sample 2 is connected with the air inlets 121.

The third chamber 13 is connected with the first chamber 11 through a plurality of air outlets 131, each air inlet 121 coaxially corresponds to one air outlet 131, and the other end of the rock sample 2 is connected with the air outlets 131.

The number of rock samples 2 that can be prepared by the sample container 1 at one time is equal to the number of air inlets 121.

The above embodiments are only exemplary embodiments of the present application, and are not used to limit the present application. The scope of protection of the present application is defined by the claims. Those skilled in the art can make various modifications or equivalent substitutions within the spirit and protection scope of the present application, and such modifications or equivalent substitutions shall also be regarded as embodiments of the present application falling within the protection scope of the present application.

What is claimed is:

1. A device for preparing rock samples with different moisture contents, comprising:
   a sample container (1), a steam generator (3), a steam compressor (4), a pump (5), a gas-liquid separator (6) and a measuring instrument (7);
   wherein the sample container (1) comprises a first steam inlet (111) and a first steam outlet (112), a rock sample (2) is placed inside the sample container (1), and two ends of the rock sample (2) are respectively connected with the first steam inlet (111) and the first steam outlet (112);
   the first steam outlet (112), the pump (5) and the gas-liquid separator (6) are connected in sequence; a gas outlet end of the gas-liquid separator (6), the steam compressor (4) and the first steam inlet (111) are connected in sequence; and a liquid outlet end of the gas-liquid separator (6), the steam generator (3), the steam compressor (4) and the first steam inlet (111) are connected in sequence;
   the water vapor in the sample container (1) is pumped into the gas-liquid separator (6) by the pump (5) to separate low-temperature water vapor and condensate, the low-temperature water vapor is compressed by the steam compressor (4) and then forms high-temperature and high-pressure water vapor again to return to the interior of the sample container (1), and the condensate enters the steam generator (3) to form water vapor again and returns to the interior of the sample container (1) after being compressed by the steam compressor (4); and
   a measuring end of the measuring instrument (7) is installed inside the steam generator (3), and the measuring instrument (7) is used for measuring a reduction of stored water inside the steam generator (3) and further calculating a moisture content of the rock sample (2);
   wherein
   a temperature control device (8) is installed inside the sample container (1), and the temperature control device (8) is used for controlling a temperature inside the sample container (1) so that the temperature inside the sample container (1) is higher than a condensation temperature of the water vapor before the water vapor permeates two ends of the rock sample (2) to start circulating, and the temperature inside the sample container (1) is gradually decreased after the water vapor permeates the two ends of the rock sample (2) to start circulating so that the water vapor in the rock sample (2) is uniformly condensed.

2. The device for preparing rock samples with different moisture contents according to claim 1, wherein
   the temperature control device (8) comprises a cold air blower (82), and the sample container (1) comprises an air cooling inlet (113) and an air cooling outlet (114); the air cooling inlet (113) and the air cooling outlet (114) are both provided with on-off valves (14); the air cooling inlet (113) is connected with an output end of the cold air blower (82), the air cooler (82) is used for outputting cold air to the air cooling inlet (113) after the on-off valve (14) is opened, and the cold air is discharged through the air cooling outlet (114).

3. The device for preparing rock samples with different moisture contents according to claim 2, wherein
   the sample container (1) comprises a cylindrical first chamber (11), which is coaxial with the rock sample (2); the first steam inlet (111) and the first steam outlet (112) are both connected with the first chamber (11); the air cooling inlet (113) and the air cooling outlet (114) are located at two ends of the first chamber (11) respectively, and the extension directions of the air cooling inlet (113) and the air cooling outlet (114) are both perpendicular to an axis of the first chamber (11) and tangent to an inner wall of the first chamber (11).

4. The device for preparing rock samples with different moisture contents according to claim 1, wherein
   the sample container (1) comprises a first chamber (11), and the rock sample (2) is placed in the first chamber (11); the first steam inlet (111) and the first steam outlet (112) are both connected with the first chamber (11), and the sample container (1) is provided with a second steam inlet (115) and a second steam outlet (116) which are connected with the interior of the first chamber (11);

an output end of the steam compressor (4) is connected with the second steam inlet (115), and the second steam outlet (116) is connected with an input end of the gas-liquid separator (6).

5. The device for preparing rock samples with different moisture contents according to claim 4, wherein
the output end of the steam compressor (4) is connected with the second steam inlet (115) through a first three-way valve (15), and a remaining port of the first three-way valve (15) is connected with the atmosphere;
the second steam outlet (116) is connected with the input end of the gas-liquid separator (6) through a second three-way valve (16), and a remaining port of the second three-way valve (16) is connected with an input end of the pump (5).

6. The device for preparing rock samples with different moisture contents according to claim 1, wherein
the sample container (1) comprises a first chamber (11), a second chamber (12) and a third chamber (13), wherein the rock sample (2) is placed inside the first chamber (11), the second chamber (12) is connected with the first steam inlet (111), and the third chamber (13) is connected with the first steam outlet (112);
the second chamber (12) is connected with the first chamber (11) through a plurality of air inlets (121), and one end of the rock sample (2) is connected with the air inlets (121);
the third chamber (13) is connected with the first chamber (11) through a plurality of air outlets (131), each air inlet (121) coaxially corresponds to one air outlet (131), and the other end of the rock sample (2) is connected with the air outlets (131).

7. The device for preparing rock samples with different moisture contents according to claim 1, wherein
a shell of the sample container (1) is prepared by a heat preservation material.

8. The device for preparing rock samples with different moisture contents according to claim 1, wherein
a water jacket (21) is sleeved on a peripheral wall of the rock sample (2), and the water jacket (21) is used for preventing water vapor from penetrating through the peripheral wall of the rock sample (2) and entering the interior of the sample container (1).

9. The device for preparing rock samples with different moisture contents according to claim 8, wherein
a sealing ring (22) is installed between an end face of the rock sample (2) and an inner wall of the sample container (1), and the sealing ring (22) is used to close a gap between the end face of the rock sample (2) and the inner wall of the sample container (1) so as to prevent water vapor from entering the interior of the sample container (1) through the end face of the rock sample (2).

10. The device for preparing rock samples with different moisture contents according to claim 4, wherein
a shell of the sample container (1) is prepared by a heat preservation material.

* * * * *